United States Patent

[11] 3,560,003

| [72] | Inventor | Laurence E. Smith<br>Cincinnati, Ohio |
|---|---|---|
| [21] | Appl. No. | 815,826 |
| [22] | Filed | Apr. 14, 1969 |
| [45] | Patented | Feb. 2, 1971 |
| [73] | Assignee | Philco-Ford Corporation<br>Philadelphia, Pa.<br>a corporation of Delaware |

[54] SEALS
5 Claims, 4 Drawing Figs.

[52] U.S. Cl. .................................................... 277/9.5,
277/32, 277/42
[51] Int. Cl. ..................................................... F16j 9/00,
F16j 15/40
[50] Field of Search ........................................... 277/9, 9.5,
32, 42, 43, 36

[56] References Cited
UNITED STATES PATENTS

| 2,823,057 | 2/1958 | Slight et al. ................ | 277/32 |
| 3,110,097 | 11/1963 | Yocum ....................... | 277/9.5UX |
| 3,189,356 | 6/1965 | Jagger et al. ................ | 277/42 |

*Primary Examiner*—Samuel B. Rothberg
*Attorney*—Carl H. Synnestvedt

ABSTRACT: A rotary shaft seal having precision lapped surfaces, and means for protecting these surfaces from contamination during preassembly handling. A first lapped seal ring has a flexible tubular boot attached thereto, which is provided with peripheral ridge means in such a way that "telescoping" of the boot causes a ridge to intercept a rigid flange provided on a second lapped seal ring, and thereby to press one of the lapped seal ring surfaces against the other. This arrangement allows keeping the lapped surfaces in firm contact with one another prior to final assembly of the seal.

PATENTED FEB 2 1971

3,560,003

INVENTOR.
LAURENCE E. SMITH
BY
Frank D. Prager
ATTORNEY

SEALS

BACKGROUND OF THE INVENTION

The lapped or highly polished surfaces of seals intended for use with submerged rotary shafts must be protected from contamination by foreign substances in order to insure proper sealing action. It is particularly important so to protect a seal if the surfaces are lapped to a high finish. Yet it is necessary to manipulate the seal rings incident to various operations prior to final assembly. Heretofore attempts were made by special packaging methods or by masking individual seal ring surfaces to keep such surfaces reasonably clean, or to hold the two seal rings together by separate fasteners or securing devices. However, such expedients frequently are insufficient to protect seal ring surfaces which have been lapped with extreme accuracy and smoothness. The separate fasteners sometimes used for holding the seal surfaces together are not always available when needed, and if they are originally provided they are sometimes lost, or inadequately applied after the seal rings have been unpacked for inspection, or otherwise handled prior to final assembly. Yet the deterioration which comes from failure to keep the finely lapped seal surfaces interengaged constitutes a hazard which must be avoided with the greatest care.

NATURE OF THE INVENTION

The invention provides ridge means slightly projecting from the wall of a flexible, tubular, invertible boot, which wall has an end portion attached to a seal ring. Pursuant to inversion of this end portion, to telescope the seal ring into the boot, a ridge intercepts an annular projection or flange on a second seal ring, superimposed over the first, and thereupon holds the two seal rings in face-to-face contact. This is achieved without the use of extraneous securing devices or clips. By means of this arrangement the invention provides greater safety for the seal surfaces than was formerly obtained, while it uses fewer parts. Thus the invention provides and protects a seal assembly of highest quality with most economical means.

DETAILED DESCRIPTION

Figure 1:
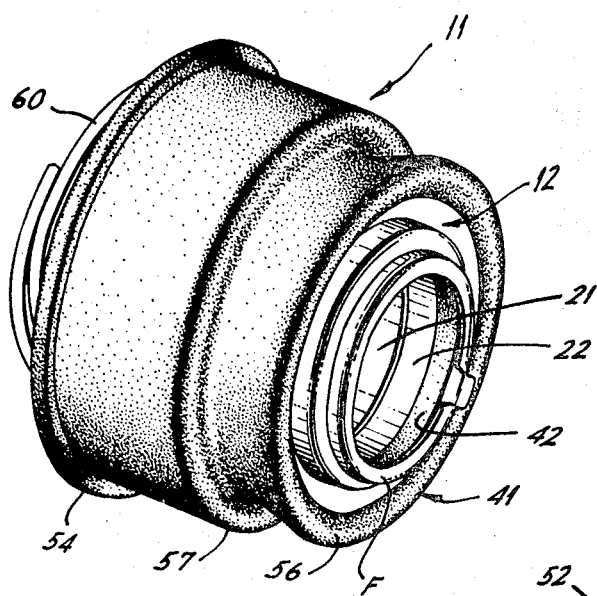
FIG. 1 is a perspective view showing the new seal prior to its installation and application.
Figure 2:
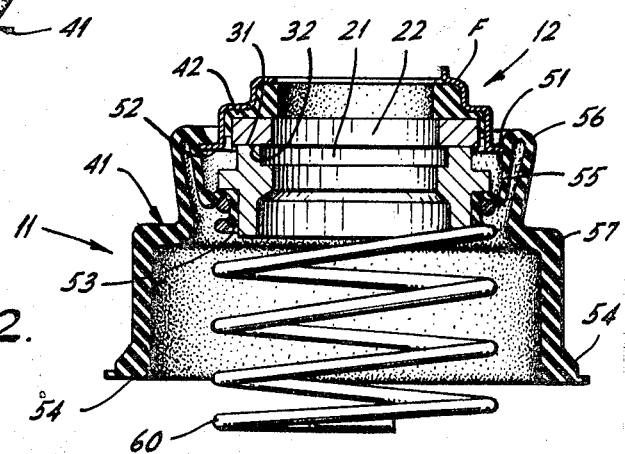
FIG. 2 is a longitudinal section through this seal.
Figure 3:
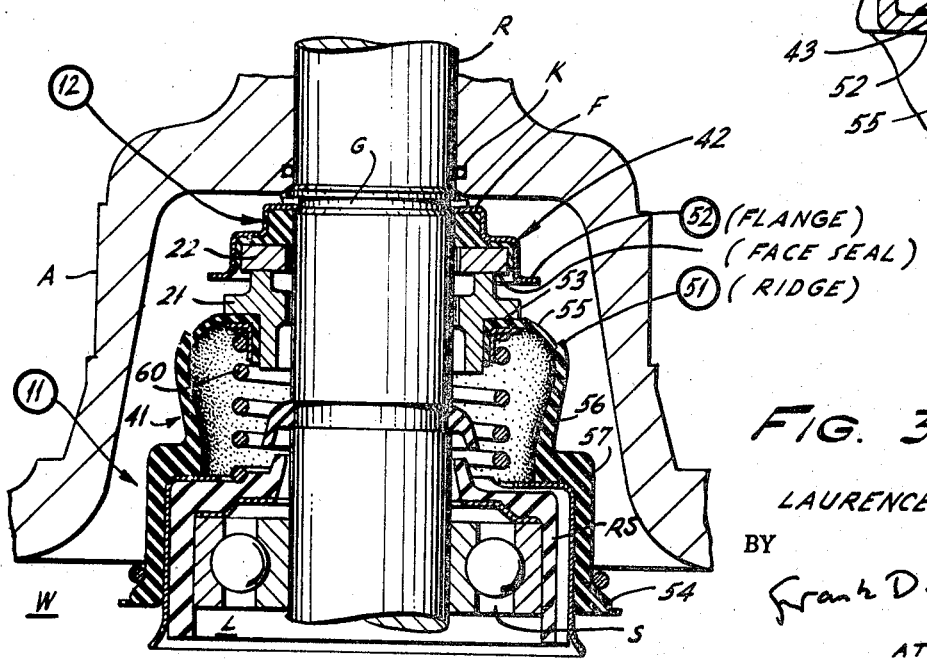
FIG. 3 is a similar section, showing the same seal as installed in a certain application thereof.

The new face seal, as generally indicated in FIG. 1, comprises first and second ring subassemblies 11, 12. As best shown in FIG. 2, each unit 11, 12 has a rigid seal ring, 21 and 22 respectively. These rings are sometimes called seal discs or washers. One of them is best made of ceramic material, the other of carbon. They are provided with lapped surfaces 31, 32, normally held in face-to-face contact or axial abutment. As indicated in FIG. 3, unit 11 is mounted on a stationary, submerged bearing structure S, while the second unit or ring subassembly is mounted on a rotary shaft R passing through this bearing structure. FIG. 3 shows the seal fully mounted and installed, while in FIG. 2 the two units 11 and 12 are preassembled or "packaged" for shipment and storage. In each unit the seal ring is attached to a boot or cap structure 41, 42.

It will be noted from FIG. 3 that the complete assembly comprises a lower (or generally, first) unit 11 having seal ring 21 held on boot 41, and an upper (or generally, second) unit 12 having seal ring 22 in cap 42. This upper unit is tightly secured to a rotary shaft R, such as is frequently used for example in household washing machines (see agitator A), while the lower and generally larger unit is somewhat similarly secured to stationary bearing parts S. In order to provide adequate sealing, particularly when the seal must withstand substantial fluid pressures or operate in corrosive or generally aggressive fluids, seal surfaces 31, 32 (FIG. 2) are lapped to an extremely fine finish, for example so that surface irregularities will not exceed a very few microns, or even fractional microns. A seal finished to such extend, the smoothness of which is often graded by optical means (for example, flatness to four helium light bands) represents a considerable investment, and must be protected with care from loss of such surface flatness by any kind of surface contamination. It is of course desirable to minimize extra cost in obtaining such protection. All this is achieved by the invention.

When the seal is installed in operative condition, FIG. 3, boot and cap structures 41, 42 mount seal rings 21, 22 on their respective stationary and rotary supports S, R, and in particular, stationary element S has a relatively wide end portion 54 of boot 41 secured thereto, while rotary element R carries a smaller cap structure 42. Boot 41 comprises, between ring 21 and bearing S, in sequence: seal ring engaging end portion 53, a seal maintaining, resiliently stretchable portion 55, ridge 51, a flexibly foldable portion 56, and a shouldered end portion 57 wherein the boot expands to fit, at 54, the relatively wide configuration of bearing S.

According to the invention, and as best shown in FIG. 2, boot and cap structures 41, 42 are used prior to final installation to hold face surfaces 31, 32 of seal rings 21, 22 engaged with one another and thereby to protect said surfaces from contamination. This preassembly interengagement of seal surfaces is obtained without any use of extraneous securing devices or clips. Boot 41 of bearing seal unit 11 is a generally tubular structure of flexible material, having at least one ridge 51, shown as a peripheral projection, which in the free condition of the boot (FIG. 3) extends around the tube between ends 53, 54 of the boot, but can be folded with adjacent boot portions into reentrant telescoping position, FIG. 2.

Figure 4:
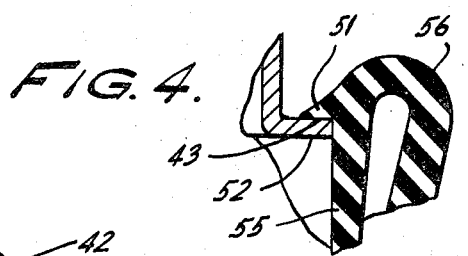
FIG. 4 is an enlarged detail from FIG. 2.

Cap 42 of shaft seal ring 22 has a rigid outer projection or flange 52, and according to the invention this flange can be intercepted by shoulder 43 on ridge 51, as is most clearly shown in FIG. 4, an enlarged representation of the corresponding detail in FIG. 2. Lapped seal ring surfaces 31, 32 are then forcibly held against one another. This is achieved by providing, between ridge 51 and the adjacent, small end 53 of boot 41, the elastic seal holding portion 55 of this boot, the action of which can be explained as follows.

In order to establish the flange-intercepting position of ridge 51, shown in FIGS. 2 and 4, the user presses unit 12 into unit 11 and thereby folds boot portion 56 into inverted position, wherein the smaller end 53 of boot 41 "telescopes" into outer and larger portions 56 of this boot. This inverting and pressing in of part of upper unit 12 into lower part 11 is yieldably resisted by the elasticity of boot 41. It is one result of this resistance that the small end of said boot (or skirt) "snaps" into a new, inverted position, when its inverting has been continued to a certain extent. As another result of the operation, tension parallel to the axis of the seal rings is developed in boot portion 55, extending from the small end 53 to ridge 51, as this portion is forced not only to telescope into the outer boot portions but also to accommodate itself to the spacing (parallel to said axis) between flange 42 on ring 22 and boot end portion 53 on ring 21.

When the boot is then released, that is, when the user no longer folds or telescopes it by manual effort, tube portion 55 remains under this axial tension. No reverse motion or telescoping-out takes place at this time, as ridge 51 and adjacent boot portions constitute elastic tube elements, wherein forces of tension and compression acting in directions around said axis have reached an equilibrium peculiar to the folded position of the unit. These forces prevent folded portion 56 from unfolding and reverting outwardly to its earlier equilibrium or free condition. Therefore ridge 51 continues to press against flange 52 and to force seal ring 21 against 22, as a result of the elastic tension in boot portion 55.

In order to install the new seal in its finally assembled position position, the user manually disconnects the interengaged ridge and flange elements 51, 52 by outwardly bending elastically folded tube portion 56. Seal assembly 11, 12 then expands to its free length shown in FIG. 3. Thereupon, as already indicated, the two units 11, 12 are installed on stationary bearing S and rotary shaft R respectively. Spring 60 is interposed between bearing S and bearing boot 41, so as to press bearing ring 21 against shaft ring 22.

In other words, prior to final installation of the new seal, lapped surfaces 31, 32 are held in contact with one another by flexible and elastically tensioned tube portion 55 (FIG. 2), whereas in finally installed position these surfaces are held in contact with one another by spring 60 (FIG. 3). In this latter position, as mentioned, the upper end of rotary shaft R may have agitator A of a washing machine secured to it, for example, by key members K, while cap 42 of seal ring 22 is secured to the shaft by a flange F engaging a suitable groove G. Provision is made by suitable controls, not shown, to fill the washing machine with washing solution or rinsing water W. The bearing assembly S, supporting the large end 54 of seal boot 41 on a suitable ring structure RS, is surrounded by and submerged in this washing solution or water W. The interengagement of lapped seal surfaces 31, 32 prevents the liquid from entering the interior of bearing structure S, while also preventing lubricating oil or grease L from seeping out of the bearing and into the water.

I claim:

1. In combination with a pair of seal ring units having lapped surfaces normally disposed in face-to-face sealing engagement, means for maintaining such engagement prior to installation of said units on rotatable shaft and bearing elements, said means comprising, as part of one of said units, a resiliently foldable tubular element having a ridgelike feature slightly projecting from a wall thereof, and further comprising, as a part of the other unit, a projection constructed and arranged to engage said ridgelike feature on inward folding of said element.

2. Apparatus as described in claim 1 wherein said ridgelike feature has a shoulder engaging said projection upon said inward folding.

3. In combination with shaft seal apparatus of the type comprising a seal ring structure having a lapped surface lying in a plane extending radially of a shaft to be sealed, and another seal ring structure having a lapped surface disposed to bear against the mentioned surface of the first mentioned ring structure and further having a resiliently foldable skirt extending from the lapped surface thereof along the axis of a shaft to be sealed, the improvement which comprises: means for protecting said surfaces against deterioration by maintaining them in face-to-face contact prior to assembly on a shaft; said means comprising at least one ridgelike projection extending outwardly from said skirt and adapted, on folding of a first portion of the skirt with respect to a second portion thereof, to engage said first mentioned ring structure and maintain the mentioned face-to-face contact.

4. A seal as described in claim 3 wherein said ridgelike projection is a single, annular ridge, normally extending around said skirt.

5. A seal comprising: a pair of seal rings having lapped surfaces for face-to-face engagement; a tubular, flexible skirt or boot element, secured to one of said rings and having an inwardly foldable wall with normally outwardly projecting ridge means thereon; said ridge means being invertible into inwardly projecting position by inward folding of said wall; and an outwardly extending projection on the other seal ring for intercepting said ridge means on inward folding of said wall to maintain the face-to-face engagement of said lapped surfaces.